(12) United States Patent
Laski et al.

(10) Patent No.: US 10,218,448 B2
(45) Date of Patent: Feb. 26, 2019

(54) SYSTEM AND METHOD FOR DETERMINING VEHICLE POSITION BASED UPON LIGHT-BASED COMMUNICATION AND TIME-OF-FLIGHT MEASUREMENTS

(71) Applicants: Joseph Laski, Stoneham, MA (US); Vimlesh Shukla, Chicago, IL (US); Jeremy Spaulding, Washington, DC (US)

(72) Inventors: Joseph Laski, Stoneham, MA (US); Vimlesh Shukla, Chicago, IL (US); Jeremy Spaulding, Washington, DC (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/422,570

(22) Filed: Feb. 2, 2017

(65) Prior Publication Data
US 2018/0219634 A1    Aug. 2, 2018

(51) Int. Cl.
*H04B 10/114*    (2013.01)
*H04B 10/80*    (2013.01)
(Continued)

(52) U.S. Cl.
CPC ............ *H04B 10/80* (2013.01); *G01S 7/4808* (2013.01); *G01S 7/4865* (2013.01); *G01S 17/08* (2013.01);
(Continued)

(58) Field of Classification Search
CPC ................................................. H04B 10/1143
See application file for complete search history.

(56) References Cited

U.S. PATENT DOCUMENTS

| 2005/0075144 A1* | 4/2005 | Muramatsu ............ B60R 25/24 455/569.2 |
| 2015/0025709 A1 | 1/2015 | Spaulding et al. |

(Continued)

OTHER PUBLICATIONS

T. Nguyen, A. Islam and Y. M. Jang, "Region-of-Interest Signaling Vehicular System Using Optical Camera Communications," in IEEE Photonics Journal, vol. 9, No. 1, pp. 1-20, Feb. 2017; published Dec. 28, 2016. doi: 10.1109/JPHOT.2016.2644960; URL: http://ieeexplore.ieee.org/stamp/stamp.jsp?tp=&arnumber=7801077&isnumber=7792275.*

(Continued)

*Primary Examiner* — Nathan M Cors
(74) *Attorney, Agent, or Firm* — Yutian Ling (57) ABSTRACT

A system and method for determining vehicle position uses light based communication (LBC) signals and a time-of-flight (TOF) pulse. Each vehicle includes a LBC system having light emitting diodes (LEDs) and receiver photodiodes capable of sending and receiving pulsed light binary messages. The LBC system may also include a TOF transceiver for sending and receiving TOF pulses, or the transmitter and receiver diodes may be used to send and receive TOF pulses. Each LBC system has a controller coupled to the transmitter diodes and receiver diodes (and the TOF transceiver when present). The controller includes a processor configured to determine the distance between vehicles. Optical characteristics are used to discern relative angle, a header is used to determine relative orientation, and the time-of-flight is used to determine distance, which together may be used by the processor to determine the relative location between transmitting vehicle and the receiving vehicle.

17 Claims, 9 Drawing Sheets

(51) Int. Cl.
  *H04B 10/116*  (2013.01)
  *H04B 10/50*   (2013.01)
  *H04B 10/69*   (2013.01)
  *G01S 17/08*   (2006.01)
  *G01S 17/87*   (2006.01)
  *G01S 17/93*   (2006.01)
  *G01S 7/48*    (2006.01)
  *G01S 7/486*   (2006.01)
  *G08G 1/16*    (2006.01)
  *H04B 10/00*   (2013.01)
  *G08C 23/04*   (2006.01)

(52) U.S. Cl.
  CPC .......... *G01S 17/875* (2013.01); *G01S 17/936* (2013.01); *G08C 23/04* (2013.01); *G08G 1/163* (2013.01); *G08G 1/166* (2013.01); *H04B 10/00* (2013.01); *H04B 10/116* (2013.01); *H04B 10/502* (2013.01); *H04B 10/691* (2013.01)

(56) References Cited

U.S. PATENT DOCUMENTS

2015/0286340 A1    10/2015  Send et al.
2016/0231746 A1     8/2016  Hazelton et al.
2017/0169301 A1*    6/2017  Kunze ................ G06K 9/00825
2017/0345310 A1*   11/2017  Yoon ...................... G08G 1/161

OTHER PUBLICATIONS

Lu, Po-Wen, et al., "Infrared-based vehicular positioning with the automatic radiation-strength control," IET Intell. Transp. Syst., 2014, vol. 8, issue 3, pp. 273-285.

Ferrara, Michele, International Search Report and Written Opinion of the International Searching Authority, for counterpart application PCT/US2018/014310, dated May 4, 2018, European Patent Office, Rijswijk, The Netherlands, 11 pages.

* cited by examiner

SYSTEM AND METHOD FOR DETERMINING VEHICLE POSITION BASED UPON LIGHT-BASED COMMUNICATION AND TIME-OF-FLIGHT MEASUREMENTS

FIELD OF THE DISCLOSURE

The present disclosure relates to light-based communication systems, and more particularly to light-based communication systems that may be used to determine vehicle position.

BACKGROUND

Determining the position and distance between vehicles on a roadway is crucial for various automotive applications. Primarily in safety critical situations, an advanced driver assistance system (ADAS) of a vehicle may alert and/or assist the driver if a collision is imminent. In addition, vehicle position estimation is essential for autonomous vehicle navigation and mapping. The position of a vehicle relative to another vehicle or roadway infrastructure provides information to the planner and the navigation system in determining alternate routes or potential hazards.

DETAILED DESCRIPTION

A system is disclosed for determining vehicle position with respect to another vehicle or an infrastructure using light based communication (LBC). The system may use digital messages (for example LBC messages or other pulsed optical messages) in combination with a signal parameter of the digital message (such as a received signal strength indication (RSSI), signal-to-noise ratio (SNR) value), or a time-of-flight pulse to estimate the position of the vehicle. Each vehicle may be equipped with one or more LBC systems to communicate with another vehicle using digital messages. Each LBC system may include a transmitter, such as an array of light emitting diodes (LEDs), and a receiver, such as an array of photodiodes, for transmitting and receiving LBC messages between the vehicles. Each LBC system also includes a controller having a processor, a vehicle communication module, and a time-of-flight module that are executable by the processor. In accordance with some such embodiments, the vehicle communication module is executed by the processor to process data using the signal parameter (e.g., RSSI) of the LBC signal. In accordance with an embodiment, the time-of-flight module is executed by the processor to process data using a time-of-flight pulse. The RSSI or time-of-flight pulse may be used to determine the relative position of one vehicle with respect to another, as will be appreciated in light of the present disclosure.

General Overview

Implementing a LBC system involves a number of non-trivial issues, particularly in communicating between vehicles. For example, some methods for real-time communication in a connected vehicle environment require broadcast transmission in an omnidirectional pattern. Dedicated short range communications (DSRC) data is an example broadcast transmission in a radio-based 360-degree field and all recipients receive the same information. As more vehicles join the connected vehicle network in dense traffic situations, the network may experience congestion and bottlenecks because every vehicle is broadcasting messages. DRSC and other methods use GPS alone or in combination with sensors on the vehicle. GPS requires the GPS receiver on the vehicle to have an unobstructed line-of-sight (LOS) view of at least four GPS satellites. GPS has limitations in determining vehicle location due to estimation error (which is typically greater than 1 m, but may be 10 m or greater) and satellite obstruction (which may be caused by tunnels, parking garages, shadowing by tall buildings, etc.). There is a need for directional, specified messages to be transmitted and received, to estimate position of a vehicle, and provide other appropriate information. There is a need for positional, distance based, or proximity based communication where the communication medium itself (the light including the LBC message) is utilized, specifically the received signal strength and/or other information contained in the decoded LBC message.

Thus, in accordance with an embodiment of the present disclosure, a system is provided for determining relative vehicle position using digital messages such as a pulsed optical signal and a signal parameter (e.g. RSSI of the LBC signal) or a time-of-flight pulse. The LBC messages may be pulsed digital messages transmitted and received using light based communication. The vehicles implement LBC systems that use a signal parameter of the digital message or time-of-flight pulse to determine the proximity and/or relative location of one vehicle with respect to the other vehicle. In an embodiment, the LBC system includes a transmitter array of LEDs and a receiver array of photodiodes. Both the transmitter and receiver arrays are coupled to a controller. The transmitter array of LEDs may be used to transmit both the digital messages and the time-of-flight pulse, in accordance with an embodiment. In another embodiment, the transmitter array may be used to transmit the digital messages and a specific time-of-flight transceiver may be used for sending and receiving the time-of-flight pulse. The controller may include a vehicle communication module and a time-of-flight module that are executable by a processor of the controller. In one such embodiment, the vehicle communication module is executed by the processor and uses trilateration to determine the distance between two vehicles by first modeling a first distance between a first transmitting LBC system and a first receiving LBC system, second modeling a second distance between a second transmitting LBC system and the first receiving LBC system, and then using trilateration to obtain the distance between the transmitting vehicle and the receiving vehicle based on the first distance and the second distance, as will be appreciated in light of the present disclosure. The distance may be discerned using two transmitting LBC systems and one receiving LBC system that receives two light signals from the two transmitting LBC systems.

In accordance with another embodiment of the present disclosure, the time-of-flight module may be executed by the processor and use the digital message and the time-of-flight pulse to determine the relative vehicle position. First, a digital message from a proximate (neighboring) vehicle is used to determine the relative angle of that vehicle, at least approximately, as being within the angular optical characteristics of the receiving light module (i.e., within a range of angles that the receiving light module may capture). Specific digital content within the header of that message may describe the location on the body of the neighboring vehicle responsible for transmitting the message, thus allowing the receiving vehicle to ascertain a relative orientation of that neighboring vehicle, as will be appreciated in light of the present disclosure. Then, a time-of-flight pulse is used to measure the distance between the neighboring vehicle and the transmitting LBC system. Finally the angle and the distance together may be used to provide a relative location of the transmitter with respect to the receiver, using a single transmitter device and a single receiver device, as will be appreciated in light of the present disclosure.

LBC-equipped vehicles in close proximity to each other are able to estimate vehicle pose more accurately because, as the vehicles become closer together, the received signal strength indicator (RSSI) becomes larger. Thus, as one vehicle becomes closer to another vehicle, the RSSI becomes larger, and likewise the RSSI decreases as the vehicles move away from each other. Thus, contrary to GPS, the accuracy improves as the vehicles become closer together.

Similarly, by using time-of-flight pulses to estimate vehicle position, information in the digital message itself, such as the message header, may be used to discern the relative angle and orientation, and the time-of-flight pulse provides the distance therebetween, and the angle and distance together provide the relative location of one vehicle with respect to another. Thus, by using the SNR/RSSI or time-of-flight values, the relative position may be determined with improved accuracy, as will be appreciated in light of the present disclosure.

Light-Based Communication (LBC) System

Figure 1:
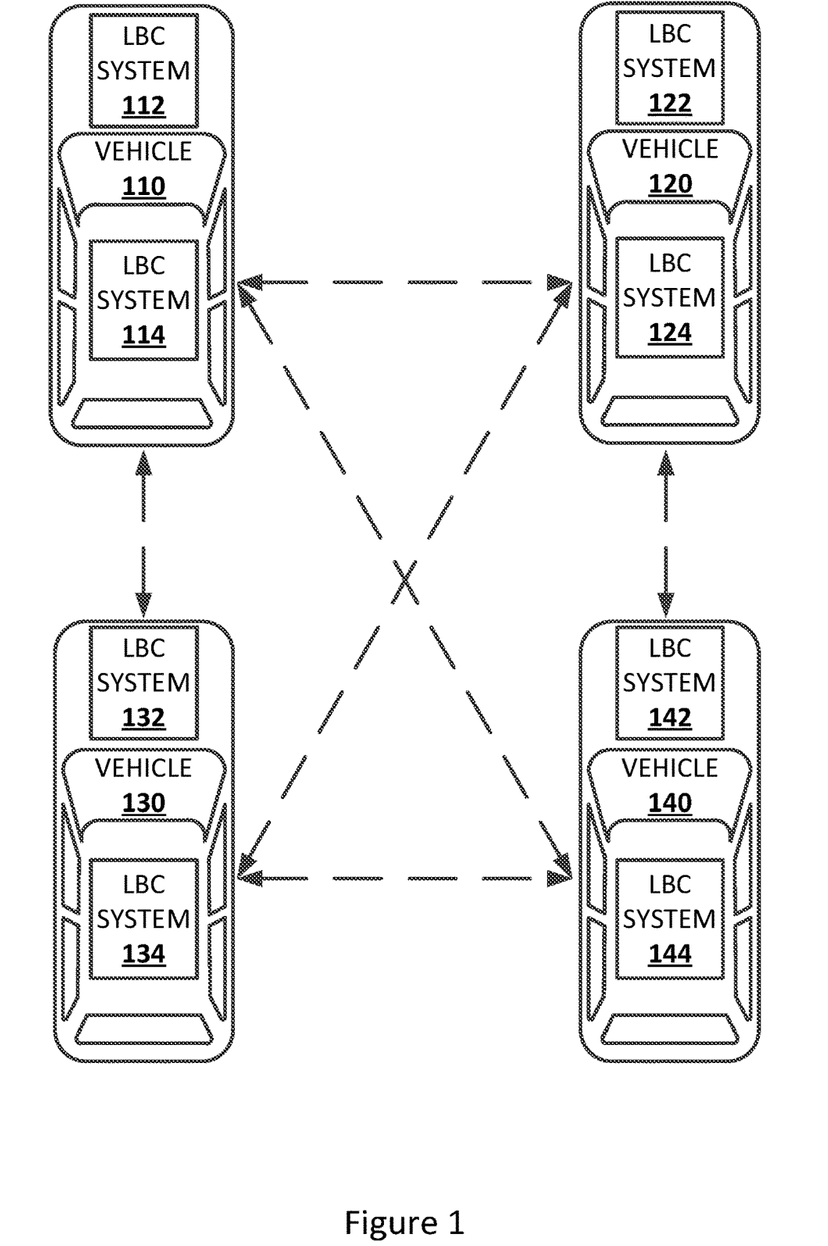
FIG. 1 illustrates a block diagram of a plurality of ground vehicles each having one or more light based communication (LBC) systems, in accordance with an embodiment of the present disclosure.

FIG. 1 illustrates a block diagram of a plurality of vehicles each having one or more light based communication (LBC) systems, in accordance with an embodiment of the present disclosure. Each vehicle includes one or more LBC systems that allow the vehicles to communicate with each other and determine their relative positions with respect to each other, as will be appreciated in light of the present disclosure. In this example, vehicle 110 includes a first LBC system 112, and a second LBC system 114; vehicle 120 includes a first LBC system 122 and a second LBC system 124; vehicle 130 includes a first LBC system 132 and a second LBC system 134; and vehicle 140 includes a first LBC system 142 and a second LBC system 144. Each of the vehicles are able to communicate with one another, as shown by the dashed-line arrows, using the LBC messages.

Figure 6:
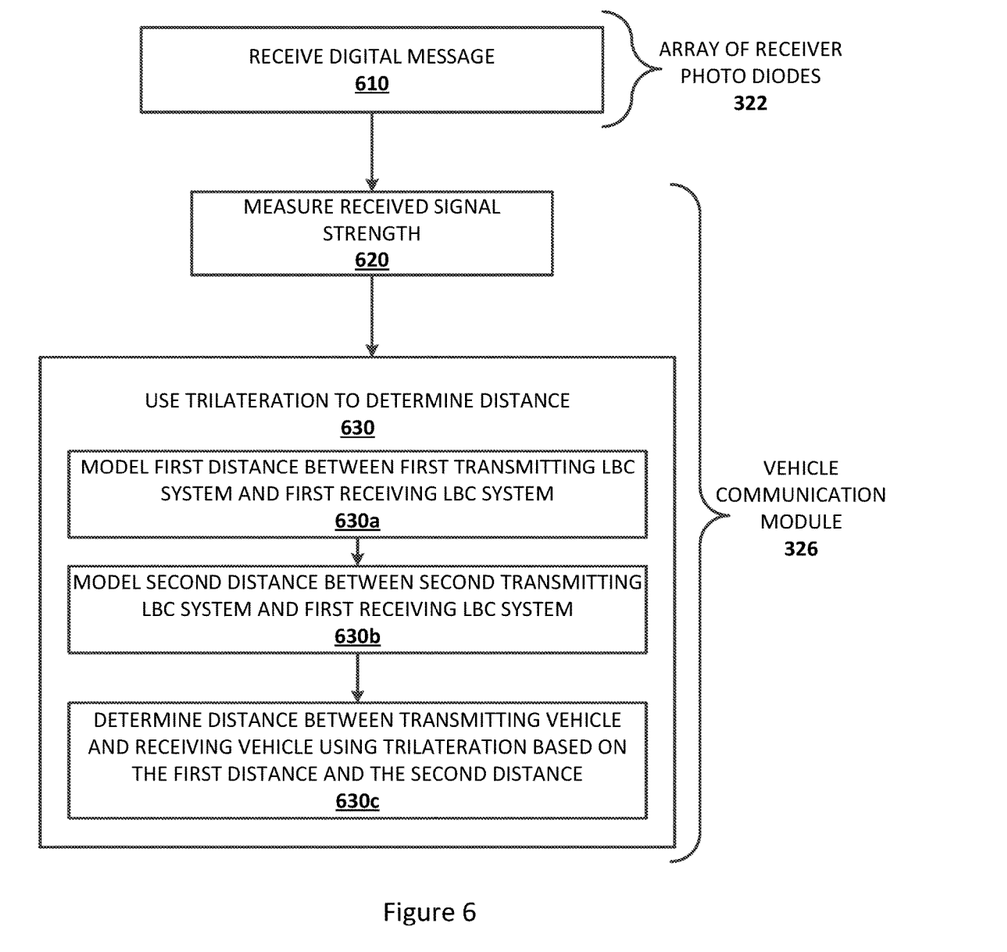
FIG. 6 illustrates a methodology for determining distance between a first ground vehicle and a second ground vehicle using trilateration, in accordance with an embodiment of the present disclosure.

With advances in vehicle-to-vehicle (V2V) and vehicle-to-infrastructure (V2I) technology connected vehicles, as shown in FIG. 1, collision avoidance strategies will require more accurate pose estimation than is capable of being determined using a global positioning system (GPS) alone. In accordance with an embodiment of the present disclosure, light-based communication (LBC) is used to determine the relative position of a vehicle using a line-of-sight (LOS) signal strength, or, a time-of-flight pulse, or another signal parameter of the LBC signal transmitted between other vehicles or another infrastructure on the roadway. In an embodiment, the received signal strength, or another parameter of the LBC signal, obtained by each LBC receiver may be used in trilateration, in accordance with one or more techniques disclosed herein, to determine the position of a vehicle using the signal strength of a given transmission from a known or locatable module. Due to inherent LOS nature of the LBC, directionality may be used to determine pose estimation along with a greater number of vehicles that are communicating on the vehicle network. Vehicles in close proximity to each other, for example vehicles 110, 120, 130 and 140 shown in FIG. 1, are able to estimate vehicle pose more accurately because, as the vehicles become closer together, the received signal strength indicator (RSSI) becomes larger. Thus, as one vehicle becomes closer to another vehicle, the RSSI becomes larger, and likewise the RSSI decreases as the vehicles move away from each other. By detecting and measuring the RSSI, the LBC transceivers are able to function independently of GPS, and a single vehicle may include multiple LBC transceivers, thereby increasing the robustness of the communication. Refer to FIG. 6 for one example methodology for determining distance using RSSI and trilateration.

Figure 8:
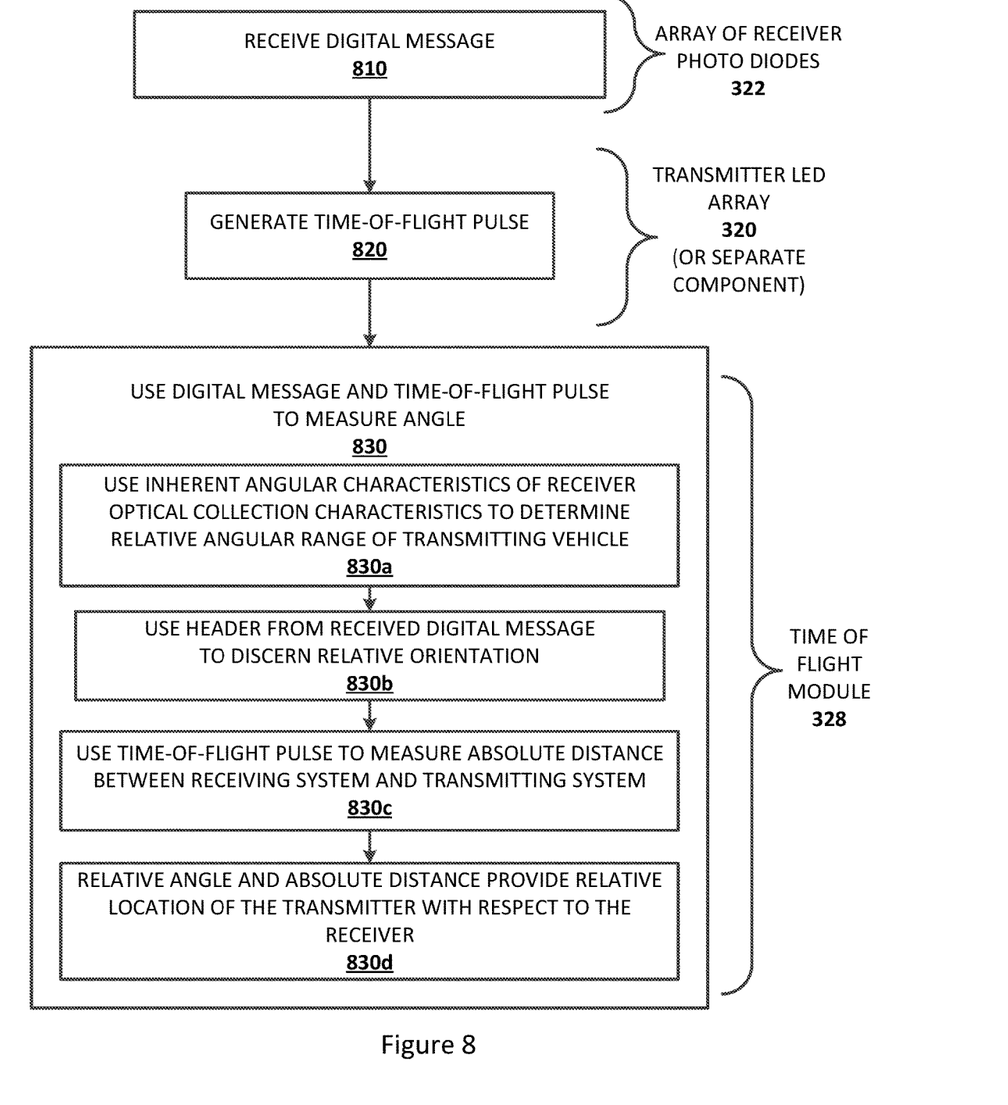
FIG. 8 illustrates a methodology for determining distance between a first ground vehicle and a second ground vehicle using a light based communication digital message and a time-of-flight pulse, in accordance with an embodiment of the present disclosure.

In another embodiment, a time-of-flight pulse transmitted at or around the same time as a LBC digital message is used to determine relative distance of one vehicle with respect to another. For example, in response to a LBC digital message received from LBC system 124 of vehicle 120, vehicle 110, and specifically LBC system 114, may send a time-of-flight pulse to the LBC system 124 of vehicle 120. The angular position of vehicle 120 is inherently known to be within the angular receiving optical characteristics defined by LBC system 114 (i.e., within a range of angles that the LBC system 114 may capture). A header of the LBC digital message from LBC system 124 of vehicle 120 may be used to discern the relative orientation of the two vehicles, and the time-of-flight pulse may be used to measure the distance between the LBC system 114 and the LBC system 124, in accordance with an embodiment. The angle and orientation from the LBC message and the distance from the time-of-flight pulse may be used to determine the relative position of the vehicles, as will be appreciated in light of the present disclosure. Refer to FIG. 8 for one example methodology for determining distance using the light signal and the time-offlight pulse. It will be appreciated in light of the present disclosure that the same light transmitter may be used to transmit the LBC digital message and the time-of-flight pulse, or a dedicated time-of-flight light transmitter may be used for transmitting the time-of-flight pulse, and a transmitter array of LEDs may be used to transmit the LBC message.

Figure 2:
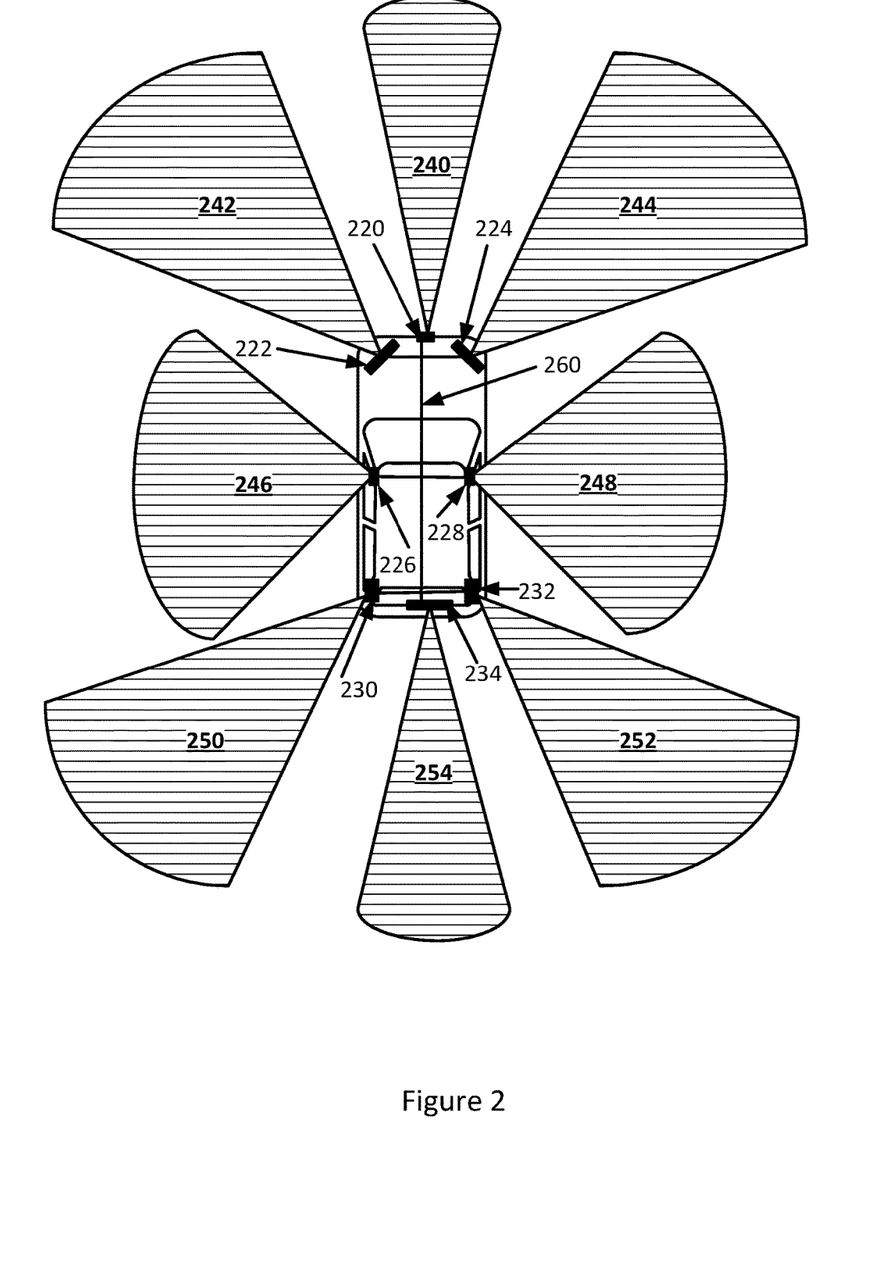
FIG. 2 illustrates a block diagram of a ground vehicle having eight LBC systems, and showing the region of communication coverage provided by the field of view of each LBC system, in accordance with an embodiment of the present disclosure.

FIG. 2 illustrates a block diagram of a vehicle having eight LBC systems, and showing the region of communication coverage provided by the field of view of each LBC system, in accordance with an embodiment of the present disclosure. In accordance with an embodiment of the present disclosure, the transceiver systems may be designed to fit within the current vehicle headlamp, tail lamp, and other lighting module locations, in accordance with an embodiment of the present disclosure. Therefore, one configuration may include six to eight LBC transceiver systems, including two to three for each of the front and rear, and an additional LBC system on each side marker light or exterior mirror. Any number of LBC systems may be provided on a vehicle, depending on the particular style or application of the vehicle, as will be appreciated in light of the present disclosure. FIG. 2 illustrates one example LBC system placement on a vehicle, in accordance with an embodiment of the present disclosure. The LBC systems may each include an array of transmitter light emitting diodes (LEDs) and a receiver array of photodiodes that contain specific optics to narrow and/or widen the field-of-view (FOV) to provide directionality for communication.

The vehicle in FIG. 2 includes a center front LBC system 220, a driver front LBC system 222, a passenger front LBC system 224, a driver side LBC system 226, a passenger side LBC system 228, a driver rear LBC system 230, a passenger rear LBC system 232 and a center rear LBC system 234. One or more of the LBC systems 220, 222, 224, 226, 228, 230, 232 or 234 may be integrated into a headlight, taillight, exterior side mirror light, or other structure of the vehicle, in accordance with an example embodiment, or may be a separate transceiver unit positioned at appropriate locations on the vehicle. A region of communication coverage provided in the field of view of each transceiver is shown in FIG. 2, in accordance with an example embodiment. The center front LBC system 220 has a region 240 of communication coverage, which is a relatively narrow region provided in the field of view of the LBC system 220. The driver front LBC system 222 has a region 242 of communication coverage, and the passenger front LBC system 224 has a region 244 of communication coverage, which are both wider than the region 240 of the center front LBC system, in accordance with an example embodiment. The driver side LBC system 226 has a region 246 of communication coverage, and the passenger side LBC system 228 has a region 248 of communication coverage, which is relatively wide, and shorter than the regions 242 and 244, in accordance with an example embodiment. The side LBC systems 226 and 228 provide a wider field of view which enhances V2V communication with adjacent vehicles. The side LBC systems 226 and 228 may also be used to assist in locating blind spots and cross traffic systems between adjacent vehicles. The driver rear LBC system 230 has a region 250 of communication coverage, the passenger rear LBC system 232 has a region 252 of communication coverage and the center rear LBC system 234 has a region 254 of communication coverage. The center front LBC system 220 and the center rear LBC system 234 have a narrow field of view (240, 254) that provides long-range communication. The LBC systems within any given vehicle may be connected together via a vehicular network and therefore know each other's location on the vehicle. More directly, the locations of each vehicle's LBC systems may be factory known from the vehicle manufacturer design. The LBC systems may also communicate with each other over a LBC bus 260, and thus may have knowledge of each other's location on the vehicle. The distributed architecture of the vehicle network allows the LBC systems to act collaboratively as appropriate and independently when desired.

The region of communication coverage provided in the field of view of an LBC system generally refers to the area in which the specified transceiver is able to communicate with another transceiver to transmit and receive light signals, in accordance with an embodiment.

Figure 3:
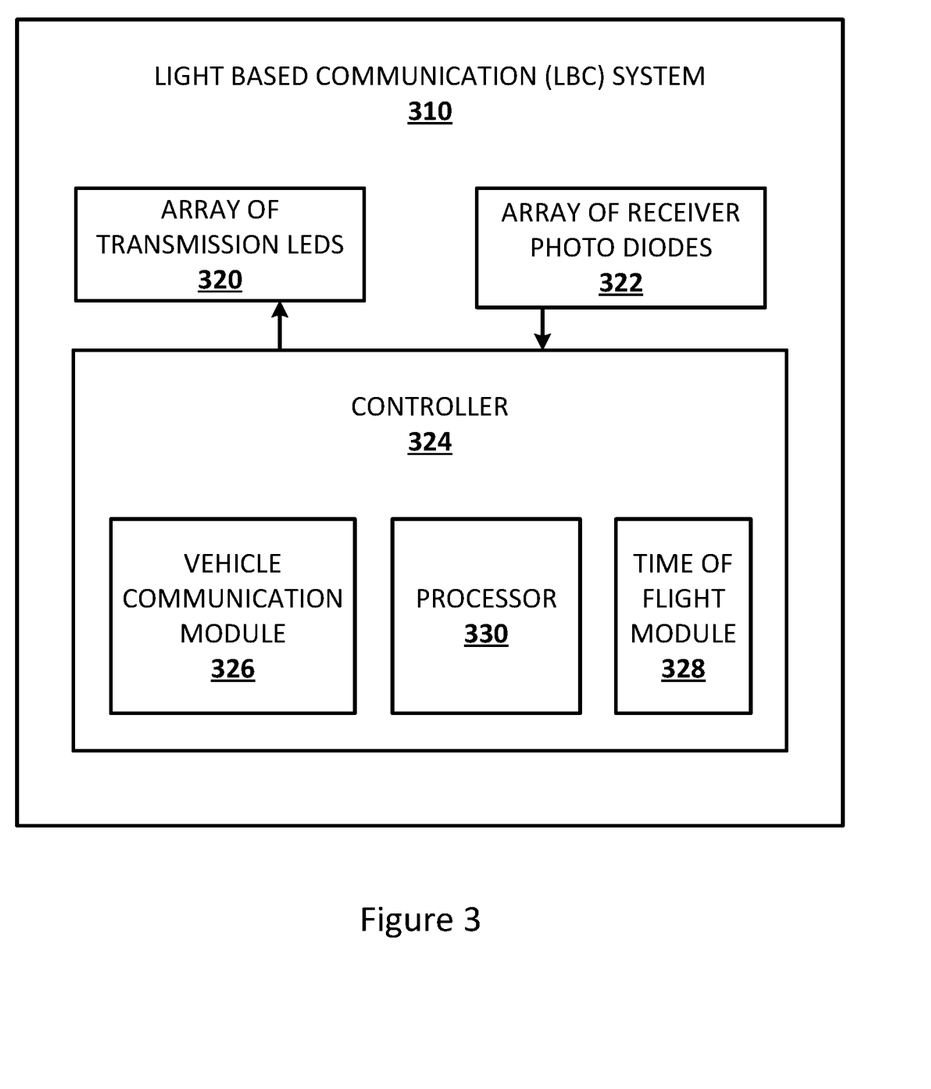
FIG. 3 illustrates a block diagram showing the components of a LBC system, in accordance with an embodiment of the present disclosure.

FIG. 3 illustrates a block diagram showing components of an example LBC system, in accordance with an embodiment of the present disclosure. Each vehicle may include one or more LBC systems to communicate with other vehicles, in accordance with an example embodiment.

An example LBC system 310 includes an array of transmission LEDs 320 with appropriate optics and a receiver array of photodiodes 322 with appropriate collection optics, each coupled to a controller 324. The array of transmission LEDs 320 may be used to transmit light signals (or other digital messages) to a receiver LBC system of another vehicle, and may also be used to send a time-of-flight pulse when applicable. The receiver array of photodiodes 322 may be used to receive light signals (or other digital messages) sent from an array of transmission LEDs of another vehicle, and may also be used to receive a time-of-flight pulse when applicable.

The controller 324 includes a vehicle communication module 326 and a time-of-flight module 328 that are each executable by a processor 330, depending upon the data analysis and processing to be performed, as will be appreciated in light of the present disclosure. The processor 330 may execute the vehicle communication module 326 to measure the RSSI and use trilateration to determine the distance between two vehicles, in accordance with an example embodiment. Refer, for example, to FIG. 6 for one example methodology for determining distance using RSSI and trilateration as performed by the vehicle communication module when executed by the processor. The processor 330 may execute the time-of-flight module 328 to use the light signal and the time-of-flight pulse to measure the distance between vehicles, as will be appreciated in light of the present disclosure. Refer, for example, to FIG. 8 illustrating one example methodology that may be implemented by the time-of-flight module when executed by the processor to determine the distance between two vehicles using the light signal and the time-of-flight pulse. Each of the modules 326 and 328 may be stored in an appropriate memory of the LBC system and may be executable by the processor 330. In an embodiment, the modules 326 and 328 may include the methodology of FIG. 6 or FIG. 8 stored in memory as a series of instructions to be carried out when the module is executed by the processor 330.

The LBC light RSSI/SNR (signal-to-noise ratio) may be modeled according to a function to correlate the transmission distance and the received signal strength. This information may be used by the vehicle communication module 326, executed by the processor 330, to determine the distance between two vehicles, for example using the function below. The function below illustrates a single light-based transceiver system. The received power, $P_R$, is a function of the distance, d, between the emitter and the detector, expressed in the following Free Space Model Friis Transmission Equation, where $P_T$ is the output power to the transmitting antenna, $G_t$ is the antenna gain of the transmitting antenna, $G_r$ is the antenna gain of the receiving antenna, $\lambda$ is the wavelength, d is the distance between the point source and the detector, and L is slit width of the wavelength:

$$P_R(d) = \frac{P_T G_t G_r \lambda^2}{(4\pi)^2 d^2 L}$$

Free Space Model Friis Transmission Equation

In accordance with an example embodiment, $G_t$, $G_r$, $\lambda$ and L are constants. Thus, $$\frac{G_t G_r \lambda^2}{(4\pi)^2 L}$$

can be represented as a constant k. Such that the received power, $P_R$ (d) can be represented as:

$$P_R(d) = \frac{P_T k}{d^2}$$

Radiometric models of a light point source and detector at distance d to depict irradiance (E) may be expressed as:

$$E = \frac{1}{d^2}$$

Figure 4:
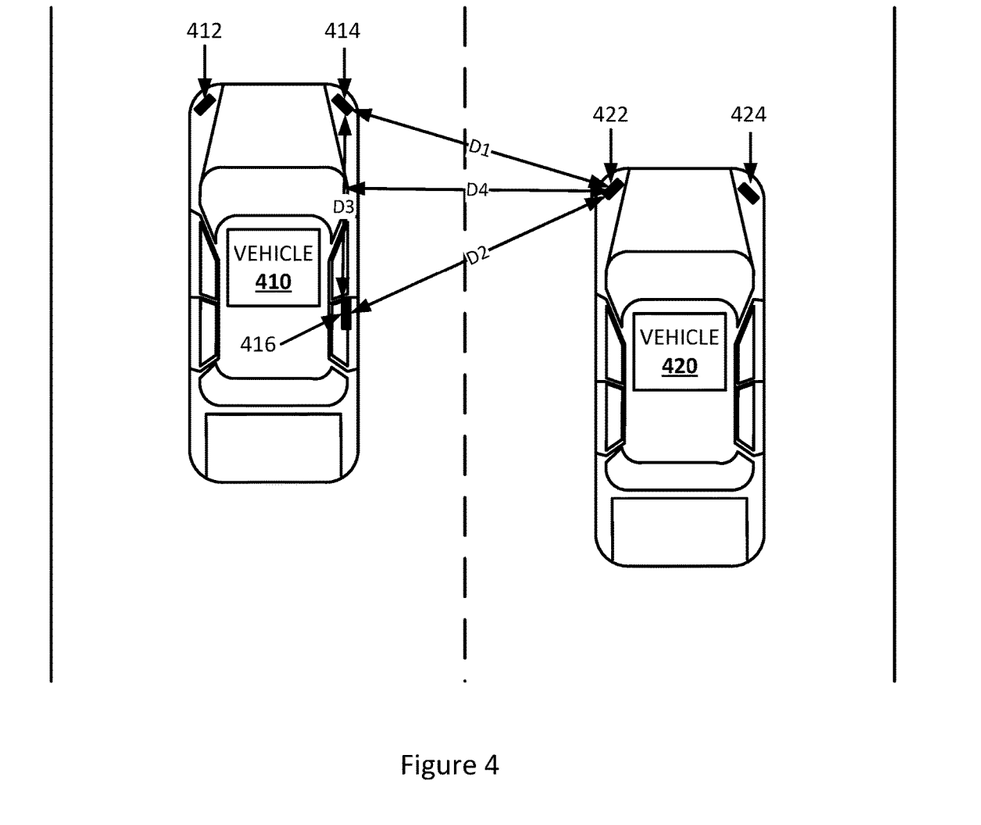
FIG. 4 illustrates a block diagram of a perspective aerial view of two ground vehicles and the relative distances therebetween, in accordance with an embodiment of the present disclosure.

Irradiance (E) thus follows an inverse square law from a point source and a distance (d) between the point source and detector. Irradiance is described as intensity per unit area. Refer to FIG. 4 for a diagram of the various triangles that may be used to determine the position of one vehicle relative to another using trilateration.

FIG. 4 illustrates a block diagram of a perspective aerial view of two ground vehicles and the relative distances therebetween, in accordance with an embodiment of the present disclosure. The vehicle 410 includes at least LBC system 412 positioned at a driver front of the vehicle 410, LBC system 414 positioned at a passenger front of the vehicle 410, and LBC system 416 positioned at a passenger side of the vehicle 410, in accordance with an embodiment. One or more LBC systems in addition to those shown in FIG. 4 may be provided in accordance with an embodiment. The vehicle 420 includes at least LBC system 422 positioned at a driver front of the vehicle 420 and a LBC system 424 positioned at a passenger front of the vehicle 420, in accordance with an embodiment of the present disclosure.

By modeling the RSSI/SNR for one transceiver system, each modeling may be replicated across at least three transceiver systems to use trilateration to determine the position of each system relative to each other. The trilateration calculation may be used to determine the location of the transceiver system that sent a particular signal. FIG. 4 shows the potential location of the LBC systems on two vehicles that are communicating. From vehicle 410, if the passenger front LBC system 414 and side LBC system 416 are communicating with the driver side LBC system 422 of the vehicle 420, and each of the LBC systems 414 and 416 may estimate each other's absolute distance from the received power measured by the detectors (for example, array of photodiodes 322 shown in FIG. 3). In accordance with an example embodiment, vehicle 410 may estimate its distance from vehicle 420 by measuring the received power transmitted by vehicle 420. The messages transmitted from the LBC systems may include a vehicle identifier (ID) and a transmitter location on the vehicle, such that any vehicle receiving the messages may identify a given transmitter. Using the transmitter identifier information and received signal strength indicator, the absolute distance between one LBC module and another LBC module may be determined, which may be used to determine the relative distance between two vehicles. For example, the absolute distance D1 between the LBC system 414 and the LBC system 422 may be determined by the LBC system 422 based upon the received signal strength from the signal emitted from the LBC system 414 (and vice versa may be determined by LBC system 414 based on received signal strength form signal when emitted from LBC system 422), the absolute distance D2 between the LBC system 416 and the LBC system 422 may be determined by the LBC system 422 based upon the received signal strength from the signal emitted from the LBC system 416 (and vice versa the distance D2 may be determined by LBC system 416 based on received signal strength from the signal when emitted from the LBC system 422). In some embodiments, D3 may be a known distance to both the LBC system 414 and the LBC system 416, as each LBC system may be configured to know the location of other LBC systems on a same vehicle, e.g. as a result of vehicle manufacturer design, which may be used to perform trilateration in accordance with the teachings of the present disclosure. Using these three calculations, the relative distance D4 between the vehicle 410 and vehicle 420 may be calculated by forming a simple triangle between the LBC systems on vehicle 410 and vehicle 420. Note that although the absolute distances D1, D2 and D3 provide the distance between the LBC systems, however these do not accurately represent the actual distance between vehicle 410 and vehicle 420 which must take into account other vehicle body features that protrude beyond the dimensions of the LBC systems, and thus, from the absolute distances, the approximate distance between vehicle 410 and vehicle 420 may be inferred. The approximate distance thus refers to the physical distance inferred between two vehicles (D4) while the absolute distance refers to the separation distance between two LBC systems. The absolute distance between the LBC systems is used in trilateration to determine the actual relative distance between two vehicles, as will be appreciated in light of the present disclosure.

Referring again to FIG. 4, two example cases are described as follows for illustrative purposes. In a first example, two receivers (e.g. LBC system 414 and LBC system 416) receive the same LBC message that has been transmitted by LBC system 422 of vehicle 420. In the first example, the message header may include information about the orientation of vehicle 420. In a second example, two LBC messages transmitted by LBC system 414 and LBC system 416, respectively, from vehicle 410 are both received by LBC system 422 on vehicle 420, in which case the message header may include specifically the distance D3.

Figure 4A:
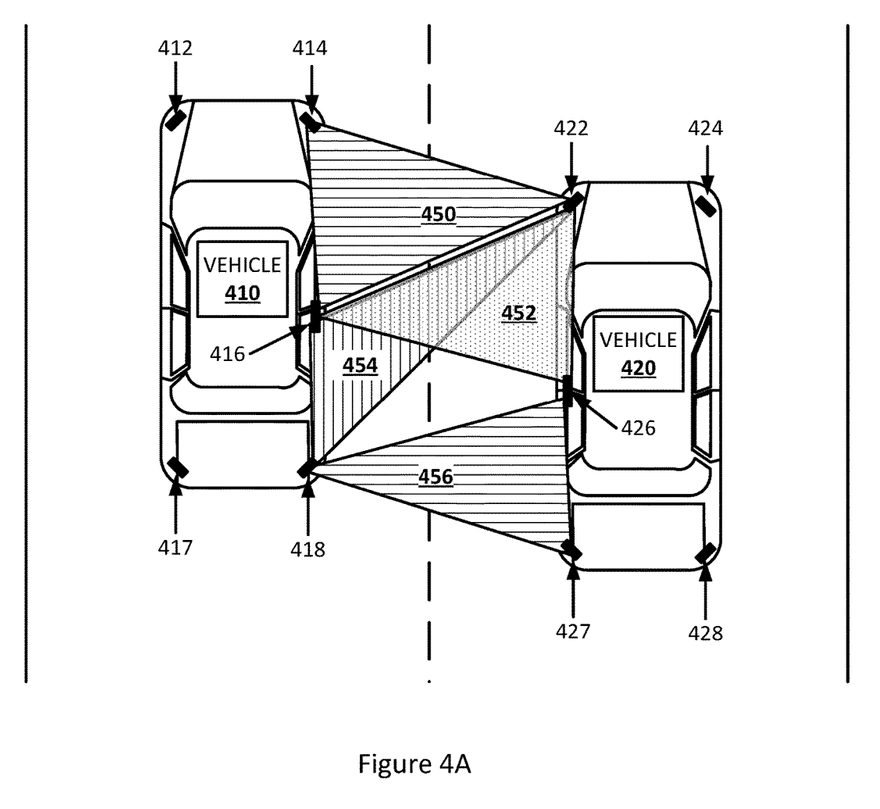
FIG. 4A illustrates a block diagram of a perspective aerial view of two ground vehicles and the various regions of communication coverage provided by the field of view generated by the LBC systems, in accordance with an embodiment of the present disclosure.

FIG. 4A illustrates a block diagram of a perspective aerial view of two ground vehicles and the various regions of communication coverage provided by the field of view generated by the LBC systems, in accordance with an embodiment of the present disclosure. In this example embodiment, vehicle 410 includes a driver front LBC system 412, a passenger front LBC system 414, a passenger side LBC system 416, a driver rear LBC system 417 and a passenger rear LBC system 418. In this example embodiment, vehicle 420 includes a driver front LBC system 422, a passenger front LBC system 424, a driver side LBC system 426, a driver rear LBC system 427, and a passenger rear LBC system 428. The number of position estimator triangles that are formed from the communication coverage of the LBC systems on vehicle 410 and vehicle 420 is shown in FIG. 4A. The number of position estimator triangles may be used to provide vehicle position measurement. An example position estimator triangle 450 may be formed by the communication between LBC system 414, LBC system 416 and LBC system 422. An example position estimator triangle 452 may be formed by the communication between LBC system 416, LBC system 422 and LBC system 426. An example position estimator triangle 454 may be formed by the communication between LBC system 416, LBC system 418 and LBC system 422. An example position estimator triangle 456 may be formed by the communication between LBC system 418, LBC system 426 and LBC system 427. As will be appreciated in light of the present disclosure, one or more position estimator triangles may be used to determine the relative position of one vehicle with respect to another.

Figure 5:
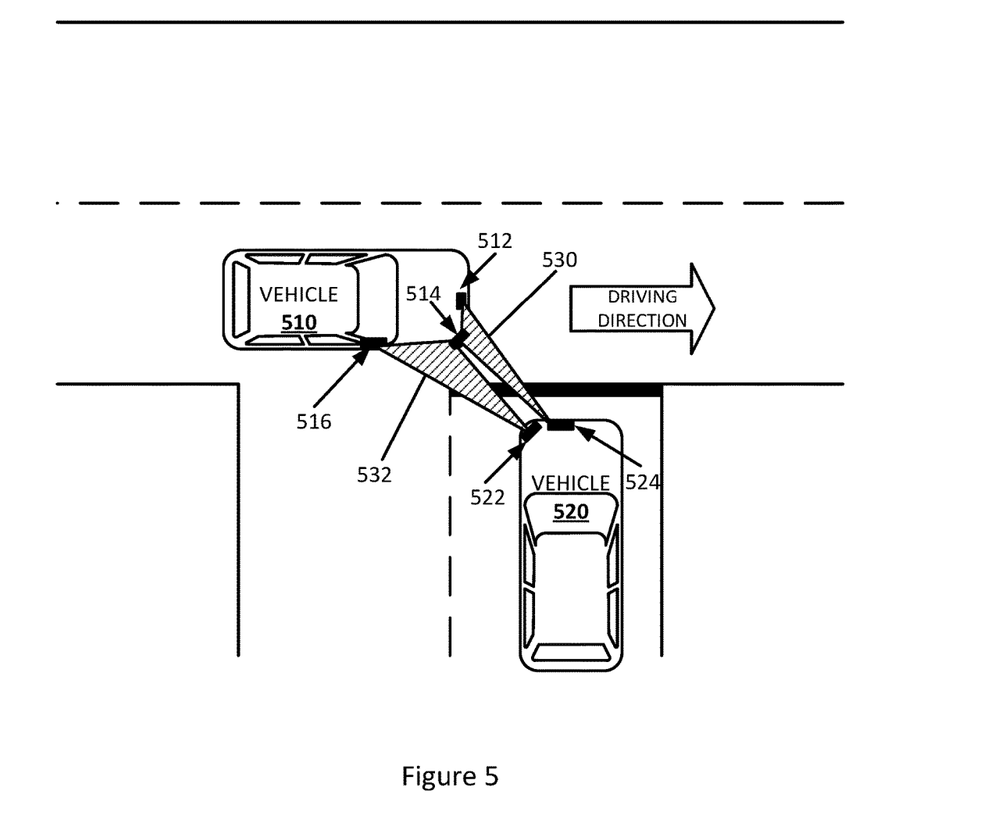
FIG. 5 illustrates a block diagram of a perspective aerial view of two ground vehicles, with one vehicle approaching the other at a T-shaped intersection, and the region of the field of view generated by the LBC systems, in accordance with an embodiment of the present disclosure.

FIG. 5 illustrates a block diagram of a perspective aerial view of two ground vehicles, with one ground vehicle approaching the other ground vehicle at a T-shaped intersection, and the region of the field of view generated by the LBC systems, in accordance with an embodiment of the present disclosure. The techniques for ground vehicle estimation using trilateration may be applied at a T-shaped intersection where vehicle 510 is approaching vehicle 520 along a driving direction. As both vehicle approach each other, the accuracy of estimated distances between vehicle 510 and vehicle 520 increase, given that the received signal strength indicator or signal to noise ratio is a stronger signal as the vehicles become closer together. This is contrary to GPS based systems, where objects are more difficult to distinguish as they become closer together.

In an embodiment vehicle 510 includes a LBC system 512 positioned at a center front of the vehicle 510, a LBC system 514 positioned at a passenger front of the vehicle 510, and a LBC system 516 positioned at a passenger side of the vehicle 510. Other LBC systems may also be included in the vehicle 510. In an embodiment, the vehicle 520 includes a LBC system 522 positioned at a driver front of the vehicle 520, and a LBC system 524 positioned at a center front of the vehicle 520. Other LBC systems may also be included in the vehicle 520. The vehicle 520 may determine its position with respect to vehicle 510 using a position estimator triangle 530 formed by the communication between LBC system 512, LBC system 514 and LBC system 524, or by a position estimator triangle 532 formed by the communication between the LBC system 514, the LBC system 516 and the LBC system 522. Trilateration techniques disclosed herein may be used to determine the distance between the vehicle 510 and the vehicle 520. In accordance with this embodiment, similar to the triangles of FIG. 4A (e.g., triangles 450, 452, 454, and 456) that are used in trilateration to determine the position of vehicle 410 with respect to vehicle 412, the triangles 530 and 532 in FIG. 5 can be used in trilateration to determine the position of vehicle 510 with respect to vehicle 520. Thus, the triangles can be used in trilateration to determine relative distance between the vehicles whether the vehicles are side-by-side, as shown in FIG. 4A, or perpendicular to each other as shown in FIG. 5. The relative orientation, and thus relative distance, between two vehicles can be determined using the triangles through performing trilateration, as will be appreciated in light of the present disclosure.

Methodology—Trilateration Using a Signal Parameter

FIG. 6 illustrates a methodology for determining distance between a first ground vehicle and a second ground vehicle using trilateration, in accordance with an embodiment of the present disclosure. A first vehicle having an array of receiver photodiodes may receive a light signal (or other digital message) and use a signal parameter (e.g., RSSI), of the light signal to determine the relative distance between the first vehicle and a second vehicle that transmitted the light signal, for example using the techniques shown in FIG. 6.

At block 610, a digital message (for example a light signal) is received, in accordance with an example embodiment. The digital message may be received at an array of receiver photodiodes, for example the receiver photodiodes 322 in FIG. 3. The receiver photodiodes 322 may be configured to receive any LBC pulsed light message or similar digital message. The digital messages received by a LBC system may include a vehicle identifier (ID) and a transmitter location on the vehicle, such that any vehicle receiving the messages may identify a given transmitter. The digital message header may include information about the orientation of the vehicle, and the digital message can include information indicating a distance between a first LBC system on a vehicle and a second LBC system on the same vehicle (for example, each LBC system in FIG. 4 can have knowledge of the distance D3).

At block 620, a RSSI is measured by the vehicle communication module when executed by the processor, in accordance with an example embodiment. The vehicle communication module, for example, may be vehicle communication module 326, and is executable by the processor, for example, processor 330 in FIG. 3. The RSSI may be used by the vehicle communication module to determine an approximate distance between two vehicles. In an example embodiment, the RSSI is measured for at least two incoming (i.e. received) light signals that are received from two distinct transmitter devices.

At block 630, trilateration is used to determine the distance between the receiving vehicle and the transmitting vehicle, in accordance with an example embodiment. Performing trilateration at block 630, in one example embodiment, may include blocks 630a, 630b and 630c. At block 630a, a first distance between the first transmitting LBC system and a first receiving module is modeled based on a first RSSI value of a light signal received from the first transmitting LBC system, in accordance with an example embodiment. At block 630b, a second distance between a second transmitting LBC system and the first receiving module is modeled based on a second RSSI value of a light signal received from the second transmitting LBC system, in accordance with an example embodiment. At block 630c, the distance between the transmitting vehicle and the receiving vehicle may be determined by the processor through trilateration based on the first distance and the second distance, as will be appreciated in light of the present disclosure. In this example embodiment, the processor (for example processor 330 in FIG. 3) may execute the vehicle communication module (for example vehicle communication module 326 in FIG. 3) to measure the RSSI at block 620 and use trilateration to determine the distance at block 630, which includes blocks 630a, 630b and 630c.

The RSSI may be calculated from receiving any message, given that the RSSI is dependent upon the signal's amplitude. The position may be accurately estimated by combining the RSSI in combination with the decoded and processed LBC message. The precise location may be calculated for a LBC system that transmitted a signal, and also the message may be processed and used for real time analysis and message validity by the receiving vehicle.

LBC System Including a Time-of-Flight Pulse

The LBC systems shown and described herein may implement time-of-flight technology to determine the relative distance between two vehicles using a single transmitter device and a single receiver device, in accordance with an example embodiment. For example, the LBC message and the time-of-flight pulse may be used to determine the distance between the transmitter LBC system and the receiver LBC system, as will be appreciated in light of the present disclosure.

Figure 7:
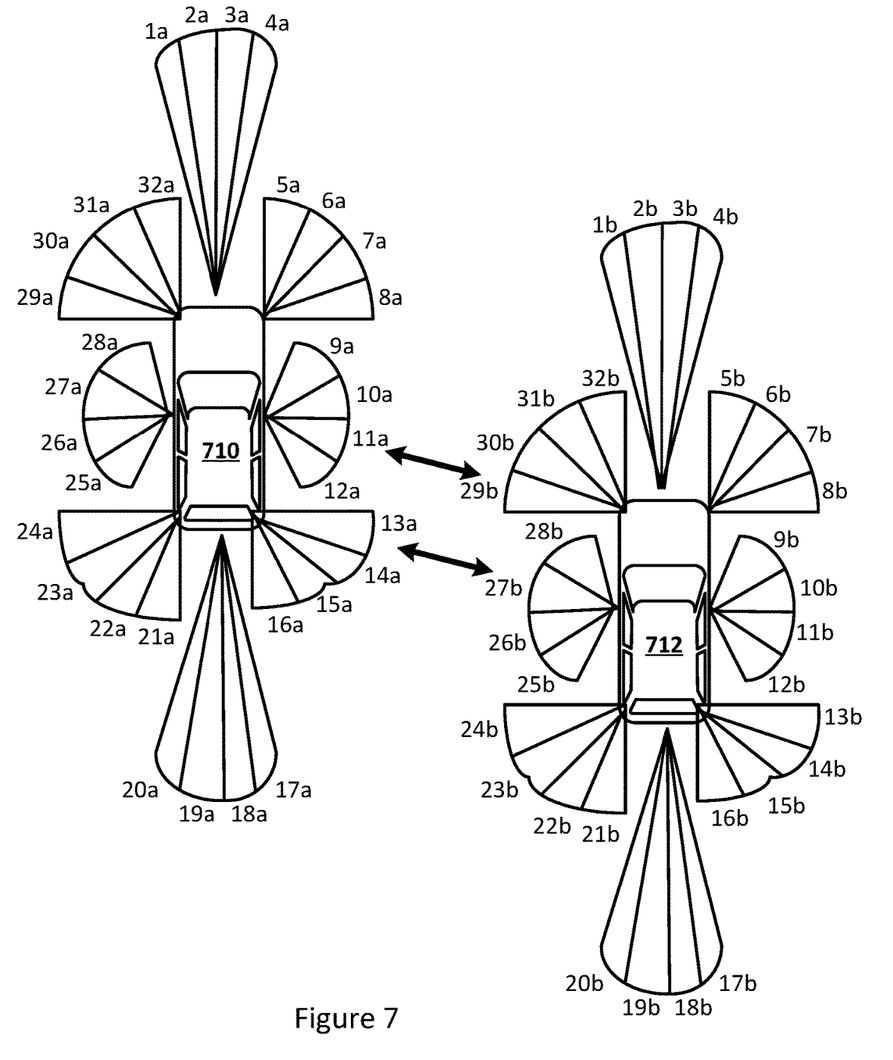
FIG. 7 illustrates a block diagram of a perspective aerial view of two ground vehicles and the various regions of communication coverage provided by each LBC system, in accordance with an embodiment of the present disclosure.

FIG. 7 illustrates a block diagram of a perspective aerial view of two ground vehicles and the various regions of communication coverage provided by each LBC system, in accordance with an embodiment of the present disclosure. A plurality of spatially configured groups of transmitter and receiver pairs is provided, in accordance with an example embodiment. In this example, a 32-unit configuration composed of eight physical LBC systems, each having four light elements aimed to specific subsets of a solid angle. Each of the 32 elements (i.e. elements 1a-32a on vehicle 710 and elements 1b-32b on vehicle 712) includes a transmitter and a receiver having the angle, respectively, of transmission and reception according to the area depicted in FIG. 7. It is proposed that each transmitter may transmit a basic safety message, including a header that identifies the body-specific location of the transmitter on the transmitting vehicle. In FIG. 7, two adjacent LBC equipped vehicles 710, 712 are interpreting each other's relative location. If vehicle 710 may discern from message header information that messages received at locations 11a and 13a are being transmitted from locations 27b and 29b, respectively, of vehicle 712, approximate angular location of vehicle 712 may be interpreted by vehicle 710. If the transmitters of either unit 11a or 13a also send out a time-of-flight pulse, just before, at the same time, or just after the incoming message have been received, then the distance measured as the pulses reflect back from the other vehicle may be associated with the vehicle which sent the message (in this case, 712). Approximate angular location of the vehicle 712 with respect to vehicle 710 is discerned by vehicle 710 from the message transmitted by vehicle 712, specifically the angle is known to be within the angle defined by the light characteristics of the receiving unit of vehicle 710. Distance of vehicle 712 with respect to vehicle 710 may be discerned from the time-of-flight pulse sent from the vehicle 710. Together, the angle and distance are sufficient to make known to vehicle 710, the relative location of the transmitter of vehicle 712. From header information within the transmitted message, the body-specific location of the transmitter is known, and thus, more detailed information may be discerned about the orientation of the neighboring vehicle. This example shows two separate determinations of relative position, between 11a and 29b, and between 13a and 27b, but in principle only one determination is required, for example between 11a and 29b or between 13a and 27b. It will be appreciated in light of the present disclosure that even if one channel of communication is provided between two vehicles, with one set of angle and distance values, this is sufficient to estimate relative position of the two vehicles.

The array of transmitting LEDs may be used to send the time-of-flight pulse in addition to the light signal(s) and the array of receiver photodiodes may be used to receive the time-of-flight pulse in addition to the light signal(s), or a dedicated time-of-flight transceiver may be used to transmit and receive time-of-flight pulses.

Methodology—Time-of-Flight

FIG. 8 illustrates a methodology for determining distance between a first ground vehicle and a second ground vehicle using a light based communication signal and a time-of-flight pulse, in accordance with an embodiment of the present disclosure. A first vehicle having an array of receiver photodiodes may receive a LBC message and generate a time-of-flight pulse, and use the LBC message and the time-of-flight pulse to determine angle and distance, respectively, between the first vehicle and a second vehicle that transmitted the LBC message. In some embodiments, the time-of-flight pulse may be received at a separate time-of-flight transceiver component that transmits and receives a time-of-flight pulse, as will be appreciated in light of the present disclosure.

At block 810, a digital message or other light signal is received, in accordance with an example embodiment. The digital message may be received at an array of photodiodes, for example the receiver photodiodes 322 shown in FIG. 3. The digital messages received by a LBC system may include a vehicle identifier (ID) and a transmitter location on the vehicle, such that any vehicle receiving the messages may identify a given transmitter. The digital message header may include information about the orientation of the vehicle, and the digital message can include information indicating a distance between a first LBC system on a vehicle and a second LBC system on the same vehicle (for example, each LBC system in FIG. 4 can have knowledge of the distance D3).

At block 820, a time-of-flight pulse is transmitted and the associated reflection is received, in accordance with an example embodiment. The time-of-flight pulse may be received at the same array of photodiodes that receives the light signal (such as photodiodes 322 in FIG. 3) or at a separate component, such as a specific time-of-flight transceiver, in accordance with an embodiment.

At block 830, the digital message and the time-of-flight pulse are used by the time-of-flight module when executed by the processor to measure the angle and distance, in accordance with an example embodiment. The processor may be, for example, processor 330 shown in FIG. 3, which may execute the time-of-flight module 328 to determine the distance between two vehicles. In accordance with an example embodiment, determining the distance at block 830 may include blocks 830a, 830b, 830c and 830d. At block 830a, the inherent angular characteristics of receiver optical collection may be used to define an angular range within which the transmitting vehicle must be in. For example, the angular range of the receiver may be used to determine the range of the transmitting vehicle. At block 830b, the header from the LBC message may be used to discern the relative orientation of the receiving vehicle with respect to the transmitting vehicle, in accordance with an embodiment of the present disclosure. At block 830c, the time-of-flight pulse may be used by the processor to measure an absolute distance between the receiving LBC system and a transmitting LBC system, in accordance with an example embodiment. For example, the receiving vehicle (i.e. the vehicle receiving the LBC message) may transmit a time-of-flight pulse and, based on the speed of light and the amount of time that it takes for the pulse to reflect from the other vehicle (in some embodiments, the vehicle transmitting the LBC message) and return to the receiving LBC system, calculate the absolute distance time-of-flight between the two vehicles. At block 830*d*, based on the relative angle of one vehicle to another vehicle provided by the light signal, and the absolute distance between the vehicle and the other vehicle, the relative location of the transmitter may be determined with respect to the receiver, in accordance with an example embodiment. The precise location of one vehicle with respect to another may thus be determined using at least one LBC system on a transmitting vehicle and at least one LBC system on a receiving vehicle, using the LBC message and the time-of-flight pulse, as will be appreciated in light of the present disclosure.

Numerous variations and configurations will be apparent in light of the disclosure. For example, one example embodiment of the present disclosure provides a first light based communication (LBC) system on a first vehicle for determining vehicle position. The system may include a transmitter array of light emitting diodes (LEDs), a receiver array of photodiodes, and a controller coupled to the transmitter array of LEDs and the receiver array of photodiodes, the controller including a processor configured to determine a relative distance between the first vehicle and a second vehicle based on a digital message and a time-of-flight pulse. In some cases, the receiver array of photodiodes is configured to receive both the digital message and the time-of-flight pulse. In some cases, the digital message is received from a second transmitter array of LEDs in a second LBC system of the second vehicle. In some cases, the system includes a time-of-flight transceiver, wherein the receiver array of photodiodes is configured to receive the digital message, and the time-of-flight transceiver is configured to receive the time-of-flight pulse. In some cases, the time-of-flight pulse is transmitted from the first vehicle, reflected off the second vehicle, and received at the first vehicle, and the digital message is received at the first vehicle from the second vehicle. In some cases, the transmitter array of LEDs is configured to transmit the time-of-flight pulse, and also transmit a second digital message to the second vehicle. In some cases, the relative distance may be determined using only the first LBC system on the first vehicle and a second LBC system on the second vehicle. In some cases, the digital message includes an angle of the second vehicle with respect to the first vehicle, and wherein the time-of-flight pulse provides an absolute distance between the first vehicle and the second vehicle, and wherein the angle and the absolute distance are used by the time-of-flight module to determine the relative distance between the first vehicle and the second vehicle. In some cases, the digital message is a LBC signal. In some cases, the digital message may include at least one of a vehicle identifier of the second vehicle, a location of a second LBC system on the second vehicle that transmitted the digital message, an orientation of the second vehicle, and a distance between the second LBC system and a third LBC system on the second vehicle.

Another example embodiment of the present disclosure includes a method for determining vehicle position using light based communication (LBC), the method including: receiving, at a first LBC system of a first vehicle, a first digital message, the first digital message being received from a second LBC system of a second vehicle; receiving, at the first LBC system of the first vehicle, a time-of-flight pulse; and determining a relative distance between the first vehicle and the second vehicle based on the first digital message and the time-of-flight pulse. In some cases, the first digital message and the time-of-flight pulse are both received at a receiver array of photodiodes in the first LBC system. In some cases, the first digital message is received at a receiver array of photodiodes in the first LBC system and the time-of-flight pulse is received at a time-of-flight transceiver of the first vehicle. In some cases, the time-of-flight pulse is transmitted from the first LBC system, reflected off the second vehicle, and then received at the first LBC system. In some cases, determining the relative distance includes determining a relative angle between the first vehicle and the second vehicle by analyzing optical characteristics of the first LBC system. In some cases, determining the relative distance includes using a header from the digital message to discern a relative orientation; using a time-of-flight pulse to measure an absolute distance between the first LBC system and the second LBC system, and determining the relative distance between the first vehicle and the second vehicle based on the relative angle and the absolute distance. In some cases, the first digital message may include at least one of a vehicle identifier of the second vehicle, a location of the second LBC system on the second vehicle, an orientation of the second vehicle, and a distance between the second LBC system and a third LBC system on the second vehicle Another example embodiment of the present disclosure provides a computer program product including one or more non-transitory processor-readable mediums encoded with instructions that when executed by one or more processors cause a process to be carried out for determining vehicle position using light based communication (LBC), the process including: determining a relative distance between a first vehicle and a second vehicle based on a first digital message and a time-of-flight pulse; and wherein both the first digital message and the time-of-flight pulse are received at a first LBC system of a first vehicle, the first digital message being received from a second LBC system of a second vehicle. In some cases, determining the relative distance includes: discerning a relative angle between the first vehicle and the second vehicle by analyzing optical characteristics of the first LBC system; using a header from the digital message to discern a relative orientation; using a time-of-flight pulse to measure an absolute distance between the first LBC system and the second LBC system; and determining the relative distance between the first vehicle and the second vehicle based on the relative angle and the absolute distance. In some cases, the first digital message may include at least one of a vehicle identifier of the second vehicle, a location of the second LBC system on the second vehicle, an orientation of the second vehicle, and a distance between the second LBC system and a third LBC system on the second vehicle. In some cases, the time-of-flight pulse may be transmitted from the first LBC system, reflected off the second vehicle, and then received at the first LBC system.

The foregoing description of the embodiments of the disclosure has been presented for the purposes of illustration and description. It is not intended to be exhaustive or to limit the disclosure to the precise form disclosed. Many modifications and variations are possible in light of this disclosure. It is intended that the scope of the disclosure be limited not by this detailed description, but rather by the claims appended hereto.

What is claimed is:

1. A first light based communication (LBC) system on a first vehicle for determining vehicle position, the system comprising:

a transmitter array of light emitting diodes (LEDs);

a receiver array of photodiodes, wherein the receiver array has a solid angle of view and each photodiode is associated with a non-overlapping subset of the solid angle of view; and a controller coupled to the transmitter array of LEDs and the receiver array of photodiodes, the controller including a processor configured to determine a relative distance between the first vehicle and a second vehicle based on a digital message and a time-of-flight pulse, wherein:

an angle of the second vehicle with respect to the first vehicle is determined to be within the subset of the solid angle of a first photodiode in the receiver array that received the digital message;

the time-of-flight pulse provides an absolute distance between the first vehicle and the second vehicle; and the angle and the absolute distance are used by the processor to determine the relative distance between the first vehicle and the second vehicle.

2. The system of claim 1, wherein the receiver array of photodiodes is configured to receive both the digital message and the time-of-flight pulse.

3. The system of claim 1, wherein the digital message is received from a transmitter array of LEDs in a second LBC system of the second vehicle.

4. The system of claim 1, the system further comprising a time-of-flight transceiver, wherein the receiver array of photodiodes is configured to receive the digital message, and the time-of-flight transceiver is configured to receive the time-of-flight pulse.

5. The system of claim 1, wherein the time-of-flight pulse is transmitted from the first vehicle, reflected off the second vehicle, and received at the first vehicle, and the digital message is received at the first vehicle from the second vehicle.

6. The system of claim 1, wherein the transmitter array of LEDs is configured to transmit the time-of-flight pulse, and also transmit a second digital message to the second vehicle.

7. The system of claim 1, wherein the relative distance is determined using only the first LBC system on the first vehicle and a second LBC system on the second vehicle.

8. The system of claim 1, wherein the digital message is a LBC signal.

9. The system of claim 1, wherein the digital message comprises at least one of a vehicle identifier of the second vehicle, a location of a second LBC system on the second vehicle that transmitted the digital message, an orientation of the second vehicle, and a distance between the second LBC system and a third LBC system on the second vehicle.

10. A method for determining vehicle position using light based communication (LBC), the method comprising:

receiving, at a first photodiode in a receiver array of photodiodes in a first LBC system of a first vehicle, a first digital message, the first digital message being received from a second LBC system of a second vehicle, wherein the receiver array has a solid angle of view and each photodiode is associated with a non-overlapping subset of the solid angle of view;

receiving, at the first LBC system of the first vehicle, a time-of-flight pulse; and determining a relative distance between the first vehicle and the second vehicle based on the first digital message and the time-of-flight pulse by:

determining an angle of the second vehicle with respect to the first vehicle to be within the subset of the solid angle of the first photodiode;

determining an absolute distance between the first vehicle and the second vehicle from the time-of-flight pulse; and determining the relative distance based on the angle and the absolute distance.

11. The method of claim 10, wherein the first digital message and the time-of-flight pulse are both received at the receiver array of photodiodes.

12. The method of claim 10, wherein the first digital message is received at the receiver array of photodiodes and the time-of-flight pulse is received at a time-of-flight transceiver of the first vehicle.

13. The method of claim 10, wherein the time-of-flight pulse is transmitted from the first LBC system, reflected off the second vehicle, and then received at the first LBC system.

14. The method of claim 10, wherein the first digital message comprises at least one of a vehicle identifier of the second vehicle, a location of the second LBC system on the second vehicle, an orientation of the second vehicle, and a distance between the second LBC system and a third LBC system on the second vehicle.

15. A computer program product comprising one or more non-transitory processor-readable mediums encoded with instructions that when executed by one or more processors cause a process to be carried out for determining vehicle position using light based communication (LBC), the process comprising:

receiving, at a first photodiode in a receiver array of photodiodes in a first LBC system of a first vehicle, a first digital message, the first digital message being received from a second LBC system of a second vehicle, wherein the receiver array has a solid angle of view and each photodiode is associated with a non-overlapping subset of the solid angle of view;

receiving, at the first LBC system of the first vehicle, a time-of-flight pulse; and determining a relative distance between the first vehicle and the second vehicle based on the first digital message and the time-of-flight pulse by:

determining an angle of the second vehicle with respect to the first vehicle to be within the subset of the solid angle of the first photodiode;

determining an absolute distance between the first vehicle and the second vehicle from the time-of-flight pulse; and determining the relative distance based on the angle and the absolute distance.

16. The computer program product of claim 15, wherein the first digital message comprises at least one of a vehicle identifier of the second vehicle, a location of the second LBC system on the second vehicle, an orientation of the second vehicle, and a distance between the second LBC system and a third LBC system on the second vehicle.

17. The computer program product of claim 15, wherein the time-of-flight pulse is transmitted from the first LBC system, reflected off the second vehicle, and then received at the first LBC system.

* * * * *